United States Patent [19]
Biggs et al.

[11] Patent Number: 4,648,469
[45] Date of Patent: Mar. 10, 1987

[54] ALLEVIATING VORTEX SHEDDING STRESS PROBLEMS

[75] Inventors: Michael D. Biggs; Frank J. Schuh, both of Plano, Tex.

[73] Assignee: Atlantic Richfield Company, Plano, Tex.

[21] Appl. No.: 779,415

[22] Filed: Sep. 24, 1985

[51] Int. Cl.$^4$ .............................................. E21B 7/12
[52] U.S. Cl. ..................................... 175/7; 166/367; 405/195; 405/202
[58] Field of Search ............... 405/202, 195; 166/350, 166/359, 367; 175/320, 5-7

[56] References Cited

U.S. PATENT DOCUMENTS

| | | | |
|---|---|---|---|
| 3,354,950 | 11/1967 | Hyde | 166/367 X |
| 3,768,268 | 10/1973 | Laffont et al. | 405/202 |
| 4,212,561 | 7/1980 | Wipkink | 166/367 X |
| 4,516,881 | 5/1985 | Beynet et al. | 166/367 X |
| 4,529,334 | 7/1985 | Ortloff | 166/367 X |

Primary Examiner—Dennis L. Taylor
Attorney, Agent, or Firm—James C. Fails; F. Lindsey Scott

[57] ABSTRACT

A method of alleviating problems with high stresses above fatigue failure levels due to vibrations modes caused by vortex shedding during the lowering and jetting-in of a large diameter surface string in deep water having a current characterized by the inclusion of a moment reducing device in the suspension conduit holding the surface string of conduit during lowering and jetting-in. Also disclosed are preferred embodiments where the moment reducing device is either a ball joint or a flex joint.

3 Claims, 6 Drawing Figures

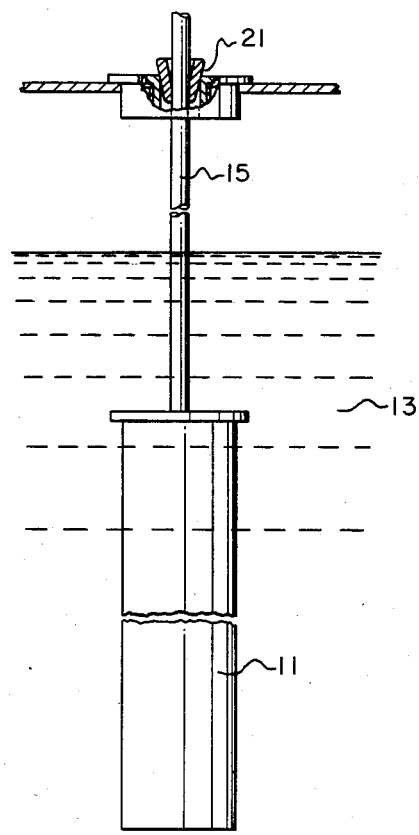
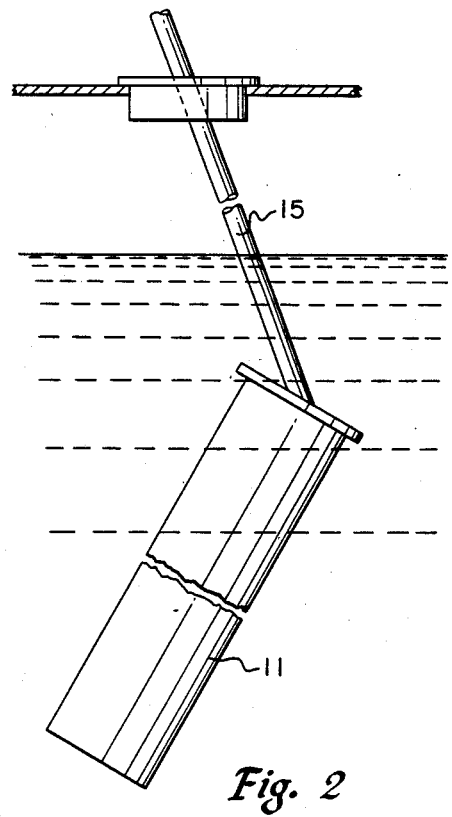
Fig. 1 Prior Art
Fig. 2
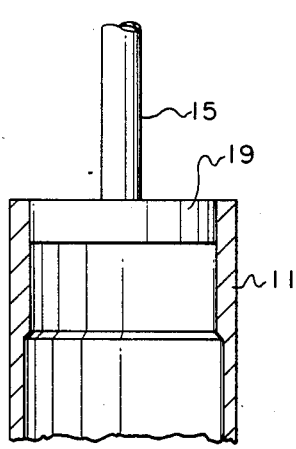
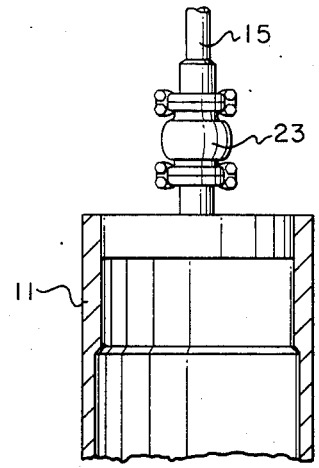
Fig. 3 Prior Art
Fig. 4

ALLEVIATING VORTEX SHEDDING STRESS PROBLEMS

FIELD OF THE INVENTION

This invention relates to a method of lowering and jetting-in a surface string in deep water having a current component. More particularly, it relates to a method of reducing bending stress due to vibrational modes caused by the vortex shedding induced by the current of the deep water while the surface string is lowered, and while suspended during a jetting-in operation, or the like.

DESCRIPTION OF THE PRIOR ART

A bluff body, such as a large diameter surface string of conduit, immersed in a fluid stream tends to produce vortices in the fluid which form and break away from the body with substantial periodicity. For certain offshore drilling operations, vortex shedding around such surface strings submerged in deep water having current components can cause serious problems. While the forces due to the vortex shedding are not especially high, the periodicity associated with them can cause harmful vibration amplitudes if sufficiently close to a natural frequency of vibration of the system comprised of the surface string of conduit and the drillstring used to lower it. In many instances during actual drilling, devices can be installed on the drill string to inhibit vortex formation as done in the prior art; but this does not appear to be feasible for a surface string such as a 30 inch casing, which must either be lowered into a small diameter hole in the seafloor, or jetted-in. A soft bottom requires that the surface string be jetted-in; hard bottoms must be drilled first, and then the surface string is merely lowered into the hole. The vortex shedding problem with the surface string occurs in either instance. Jetting-in, however, does expose the surface string to the problem longer, making failure more likely. The stresses could get high enough to produce a failure in a short time, possibly even in the time required to lower the casing into a drilled hole. Any external devices put on the 30 inch casing would cause the casing to hang up before it reached the desired depth in the hole.

SUMMARY OF THE INVENTION

In accordance with this invention there is provided an improvement in a method of lowering and jetting-in a surface string of large diameter conduit in deep water having a current component and consisting essentially of suspending the surface string of conduit from a smaller diameter conduit; circulating jetting-in fluid downwardly from a drilling rig through the smaller diameter conduit and the surface string and an internally contained jetting-in assembly selected therefor and allowing the jetting action and the weight of the surface string to emplace the surface string to a predetermined desired depth. The improvement is characterized by emplacing a moment reducing device in the smaller diameter conduit near its connection with the surface string so as to reduce the bending stresses caused by vibration modes to be below fatigue failure levels. The vibration modes are caused by the vortex shedding, as indicated, and may cause vibration mode stresses that are so high as to cause failure during the lowering and jetting-in of the surface string.

In one of the preferred embodiments the moment reducing device comprises a ball joint. On the other hand, if desired, a flex joint can be employed. The ball joint or flex joint is preferably employed in the smaller diameter conduit, since it is less expensive to obtain such moment reducing devices in the smaller pipe sizes and since they can be employed to effectively reduce the stresses below fatigue failure levels in the smaller diameter conduit.

BRIEF DESCRIPTION OF THE DRAWINGS

FIG. 1 shows the suspension of a surface string from a drilling rig by a smaller diameter conduit in deep water having no current component.

FIG. 2 is a side elevational view partly schematic, showing the displacement caused by a current component in the deep water during the jetting-in operation of the surface string.

FIG. 3 illustrates a typical prior art type hanger showing the hanging of the surface string from a smaller diameter conduit.

FIG. 4 illustrates the inclusion of a moment reducing device in accordance with this invention.

DESCRIPTION OF PREFERRED EMBODIMENTS

Figure 5:
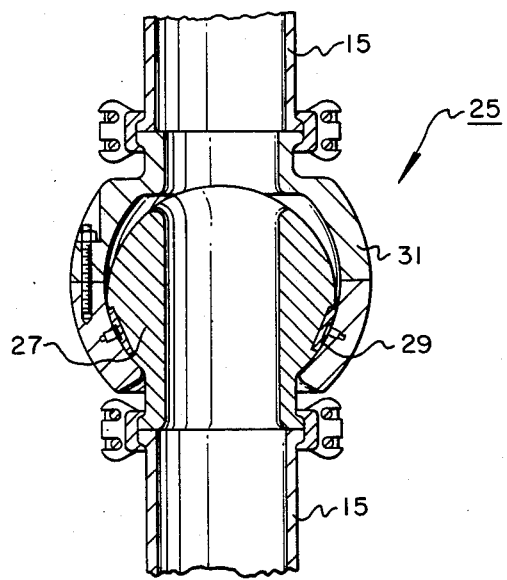
FIG. 5 is a partial cross-sectional view showing a ball joint suitable for use in this invention.

Referring to FIGS. 1 and 2, there is illustrated a method of lowering and jetting-in a surface string of conduit 11 in deep water 13; FIG. 2 illustrating having a current; consisting essentially of suspending the surface string of conduit 11 from a smaller diameter conduit 15 and circulating jetting-in fluid downwardly from a drilling rig 17 to the smaller diameter conduit and the surface string of conduit and an internal jet assembly selected for the surface string (the internal jet assembly not being shown). As illustrated in FIG. 3, in the prior art the surface string 11 was suspended by suitable hangers 19 from the smaller diameter conduit 15. For example, a 30 inch casing might be employed as the surface string 11 and be suspended from 5 inch drill string 15. For example, the rig floor 17, FIG. 1, may have been holding by suitable slips 21 or the like, the 5 inch drill pipe which might be one or multiple joints 90 feet or longer and suspending the drill string 11 which might be about 200 feet of 30 inch casing. The jetting assembly would be inside the casing and might weigh about 14,000 pounds. Additional lengths of drill pipe are added as necessary to get the casing into place on the bottom of the sea floor. Adding drill pipe tends to lower the natural frequencies of oscillation of the respective harmonics in the illustrated prior art. Where there is a current component, as illustrated in FIG. 2, the 5 inch pipe may be moved to the right as shown. A typical second mode of vibration might be induced by vortex shedding to give a vibration frequency of about 0.18 Hertz. Such a harmonic could produce, in a current of about 1.6 knots, vortex shedding to give an amplitude vibration of about 3.8 feet and stress of about 76,000 pounds per square inch (psi). This high alternating stress would rapidly fatigue.

In accordance with this invention, there is employed an improvement as illustrated in FIG. 4 of a moment reducing device 23 being included in the string of smaller diameter pipe 15 from which is suspended the surface string 11. Preferably the moment reducing device 23 is employed near its connection with the surface string, as adjacent the hanger 19, so as to reduce bending stress to levels that do not cause fatigue failure through the vibration modes introduced by the vortex shedding because of the current flowing about the surface string while it is being lowered and jetted in.

There are a plurality of kinds of moment reducing devices known to the prior art. For example, FIG. 5 illustrates a ball joint 25. As is recognized, ball joints may have a plurality of types of structures and are currently employed in risers for drilling conductor hole or the like. While these ball Joints may be employed in any one of a plurality of sizes, it is ordinarily sufficient to employ one in the smaller conduit 15, as illustrated in FIG. 4. These ball joints include an arcuate knob 27 that is retained with suitable friction reducers 29, interiorly of a holder 31 having a degree of internal curvature that matches the exterior, or external, curvature of the knob 27 for greater bearing surface. Typical friction reducers may comprise silicones, silicone rubbers, greases or even lubricant impregnated solids such as brass or the like. Of course, the design will be selected to hold the weight that will be imposed on the ball joint without too great a friction.

Figure 6:
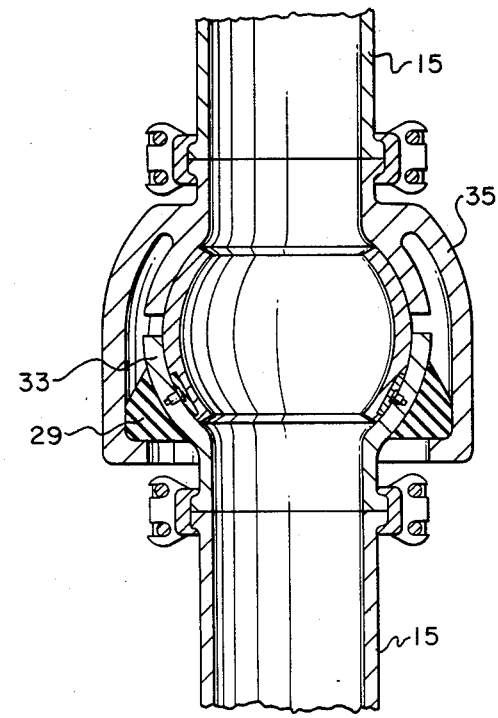
FIG. 6 is a partial cross-sectional view showing a flex joint suitable for use in accordance with another embodiment of this invention.

FIG. 6 illustrates a type of flex joint that has a similar structure that allows a bend to take place without introducing too great a stress. Similarly as described with respect to the ball joint, there is an internal knob 33 on the bottom extending portion of the tubing 15. The arcuate housing 35 allows room for the knob to accommodate a bend without introducing excessive stress. The housing may be bolted together to allow access to the flex joint for replacing the flexible supports or the like.

The advantage of employing one of the moment reducing devices 23 in accordance with this invention can be illustrated by considering the foregoing example which produced 76,000 pounds per square inch stress. If a flex joint is employed with a stiffness of 100 foot pounds per degree, bending stress is reduced to about 2200 pounds per square inch in the example. Thus it can be seen that the stress is lowered to an acceptable magnitude. Stresses away from the moment reducing device 23 will be similarly acceptable for the vibration modes likely to be excited by the periodicity of the vortices being shed by the casing in the current.

From the foregoing it can be seen that this invention accomplishes the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a method of lowering and jetting-in a surface string in deep water having a current and consisting essentially of:
   a. suspending the surface string of conduit from a smaller diameter conduit;
   b. circulating jetting-in fluid downwardly from a floating drilling rig through said smaller diameter conduit and said surface string of conduit and an internal jet assembly therewithin and selected therefor; and
   c. allowing the jetting action and the weight of said surface string of conduit to emplace said surface string of conduit to a predetermined desired depth in the earth formations at the bottom of the deep water;

The improvement comprising:
   d. placing a moment reducing device in said smaller diameter conduit near its connection with said surface string so as to reduce bending stress to a non-fatigue failure level, said bending stress being caused by vortex shedding vibration modes on said surface string while suspended during the lowering and jetting-in.

2. The method of claim 1 wherein said moment reducing device comprises a ball joint.

3. The method of claim 1 wherein said moment reducing device comprises a flex joint.

* * * * *